United States Patent [19]

Stevens et al.

[11] Patent Number: 4,591,292

[45] Date of Patent: May 27, 1986

[54] SUBSEA PULL-IN TOOL

[75] Inventors: James W. Stevens, Houston; William H. Petersen, Kingwood, both of Tex.

[73] Assignee: Shell Offshore Inc., Houston, Tex.

[21] Appl. No.: 614,426

[22] Filed: May 25, 1984

[51] Int. Cl.⁴ .......................... F16L 1/04; E21B 43/01
[52] U.S. Cl. .................................. 405/169; 166/341; 166/347
[58] Field of Search ............... 405/158, 169, 170, 195, 405/224; 166/338, 341, 342, 343, 344, 345, 347

[56] References Cited

U.S. PATENT DOCUMENTS

| | | | |
|---|---|---|---|
| 3,710,859 | 1/1973 | Hanes et al. | 166/341 X |
| 3,973,625 | 8/1976 | Baugh | 166/347 X |
| 4,382,717 | 5/1983 | Morrill | 405/169 |
| 4,457,378 | 7/1984 | Watkins | 166/347 |
| 4,459,065 | 7/1984 | Morton | 405/169 |
| 4,518,042 | 5/1985 | Miller | 166/347 |

Primary Examiner—David H. Corbin

[57] ABSTRACT

The present invention provides a method and apparatus for connecting a flowline to a subsea structure. A flowline connection tool is deployed downwardly to the subsea structure and secured to the subsea structure. A flowline terminal head, which is at the end of a flowline, is then pulled toward the flowline connection tool by means of a pull-cable. The flowline terminal head is then secured to the subsea structure and the flowline connection tool is recovered to the surface.

The flowline connection tool contains a prime mover means in order to minimize the length of cable exposed to forces encountered in pulling the flowline to the subsea structure.

6 Claims, 11 Drawing Figures

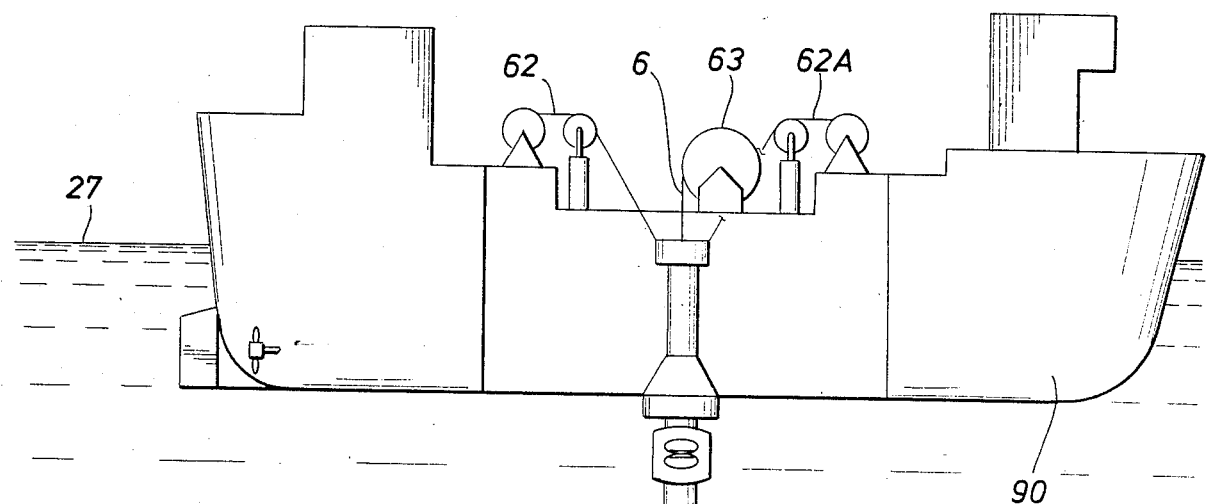
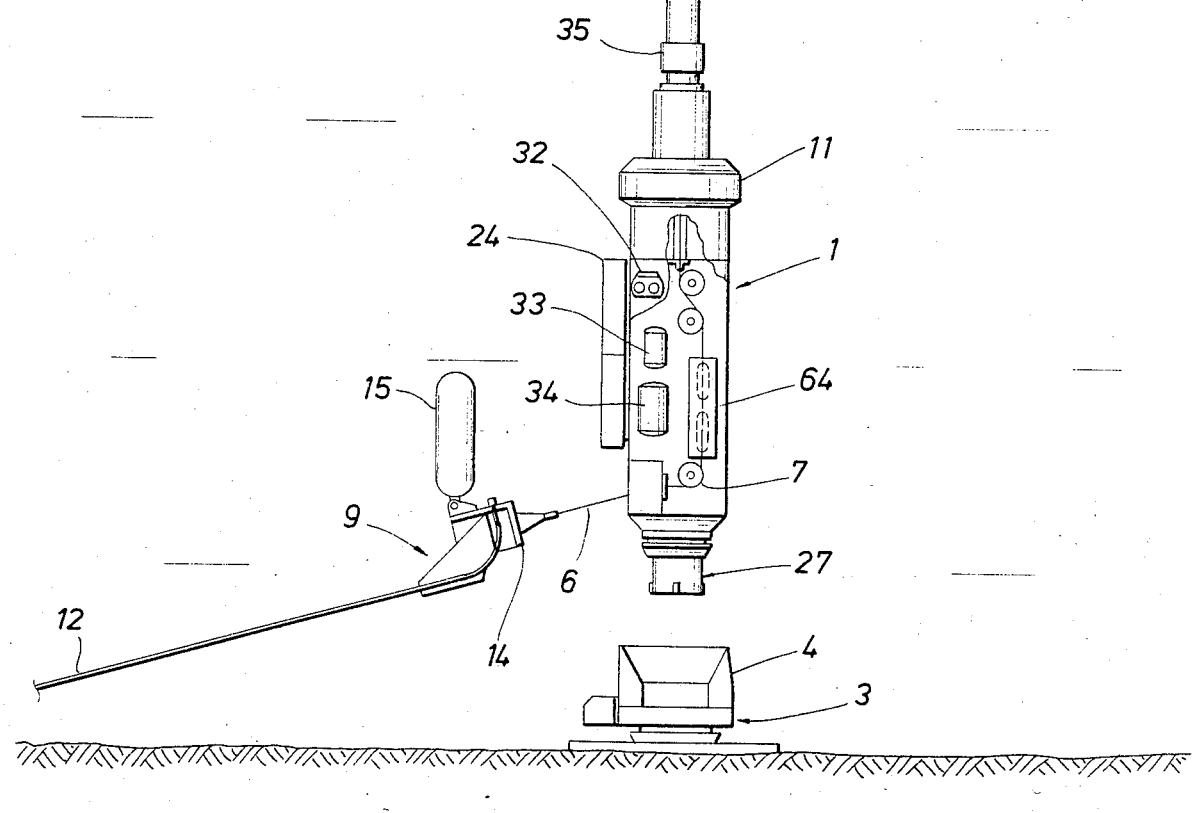
FIG.1

FIG. 7A
FIG. 7B
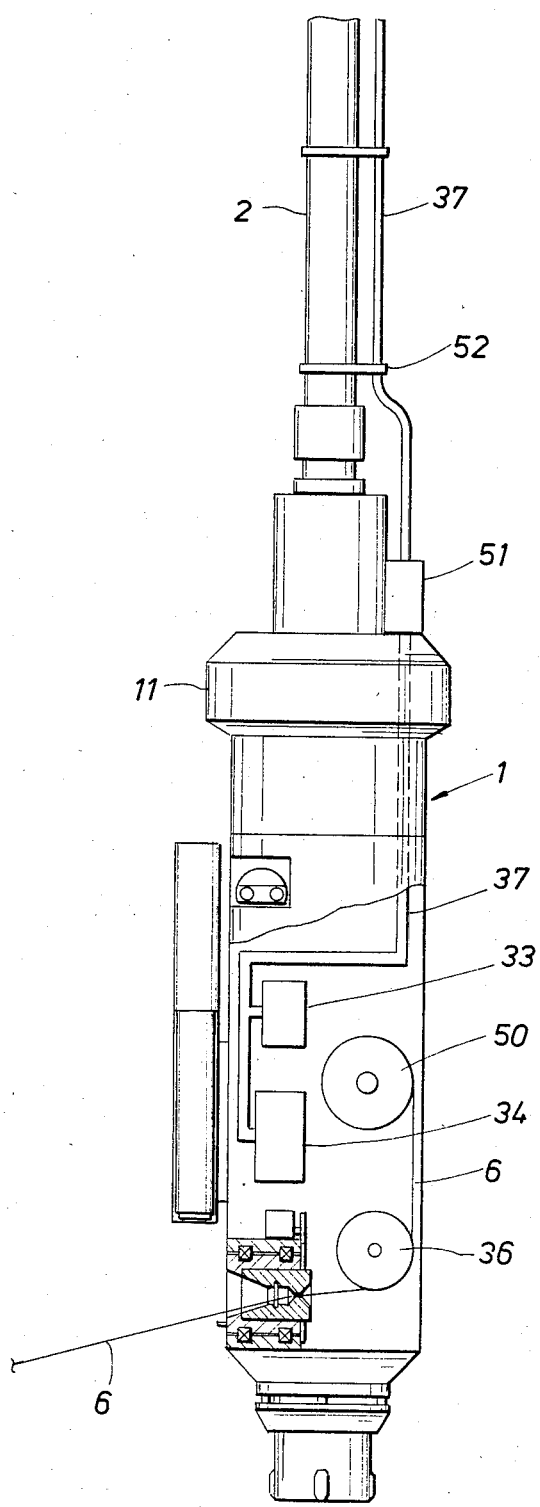
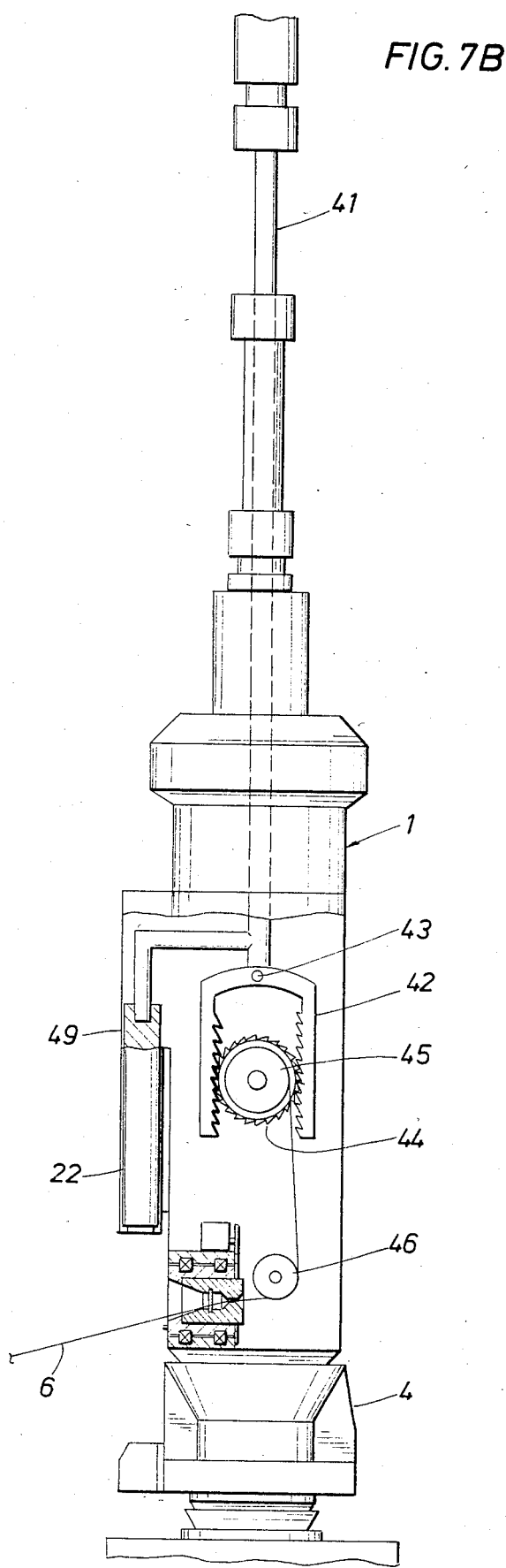

SUBSEA PULL-IN TOOL

RELATED APPLICATIONS

This application is related to the following co-pending applications Ser. Nos. 499,013 filed May 27, 1983, now U.S. Pat. Nos. 4,558,972; 564,605 filed Dec. 22, 1983, and 614,425 filed May 25, 1984.

BACKGROUND OF THE INVENTION

In accordance with the above related applications a flowline bundle is connected to a subsea structure such as a production facility, by using a riser to deploy a flowline connection tool to the subsea structure. The flowline bundle is then pulled to the subsea structure by a pullcable connected between the flowline connection tool and the flowline bundle. As described in the above related co-pending applications the flowline connection tool consists primarily of an idler pulley mounted within the structural framework of the connection tool. The pullcable which is used to pull the flowline bundle to the subsea structure passes over this idler pulley on its way to a power winch mounted on the surface vessel. The pullcable either passes through the center of the riser on its way to the surface, or is guided to the surface alongside the riser's outer surface by means of cable guides attached to the riser.

The problem associated with this system is that the pullcable must be tensioned over its entire length from the surface power winch to the flowline bundle. Stretch of this capable over its length (which is sometimes 6500') causes resilient or "spongy" response from the time of actuation of the surface winch to the time of actual movement of the flowline bundle. Additionally, exposure of the cable's entire length to the tension required for pulling the flowline bundle increases the probability of cable failure. A method and apparatus need be developed which effects quicker system response while minimizing the likelihood of cable failure, and at the same time affords easy securement of the flowline bundle to the subsea structure.

SUMMARY OF THE INVENTION

The present invention locates the pullcable prime mover means within the structure of the flowline connection tool. This minimizes the length of cable subject to full tension loading, which decreases system response time and the probability of cable failure. It also provides better control of the pull-in operation and decreases the chance for damage to the subsea equipment. The flowline connection tool also incorporates mechanisms for securing the flowline bundle to the subsea structure, which can be operated without the assistance of divers. The overall mechanism therefore allows for diverless deep sea connection of one device to another, such as connection of a flowline to a wellhead structure, connection of electrical cabling to an undersea junction, or the connection of interlocking structural elements forming an undersea structure.

Preferably, a flowline connection tool is deployed downwardly from a surface vessel and landed onto a subsea structure. A pipeline or flowline bundle is deployed onto or near the seabottom a short distance away.

A flowline terminal head at the end of the pipeline or flowline bundle is then pulled to the connection tool using a pullcable and a cable pulling means such as an electric or hydraulic powered winch which is part of the connection tool. A flowline terminal head receptacle carried by the connection tool is used to grip, orient and align the flowline terminal head. Finally, the terminal head is secured to the subsea structure, and the connection tool and riser are recovered to the surface.

More preferably, the terminal head is secured to the subsea structure by vertically inserting a retainer pin carried by the flowline connection tool into a retainer pin receiver of the subsea structure. A bullnosed carrier which carries the flowline terminal head is secured to the connection tool by pulling a bullnose of the bullnosed carrier into a rotatable receptacle of the connection tool. Thereafter a retainer pin is driven into the terminal head to a retainer pin receiver mounted in the subsea structure. This action disengages the bullnosed carrier from the terminal head as the terminal head moves downward to its final secured position.

Other purposes, distinctions over the art, advantages and features of the invention will be apparent to one skilled in the art upon review of the following.

BRIEF DESCRIPTION OF THE DRAWING

FIG. 1 is a schematic representation of a flowline connection tool prior to landing onto a subsea structure.

FIG. 7A shows a possible connection tool configuration wherein the pullcable remains stowed with the tool instead of returning to the surface.

FIG. 7B shows a possible ratchet and pawl configuration that could be used as an alternative to the power jack disclosed in the preferred embodiment.

DESCRIPTION OF THE PREFERRED EMBODIMENT

Figure 2:
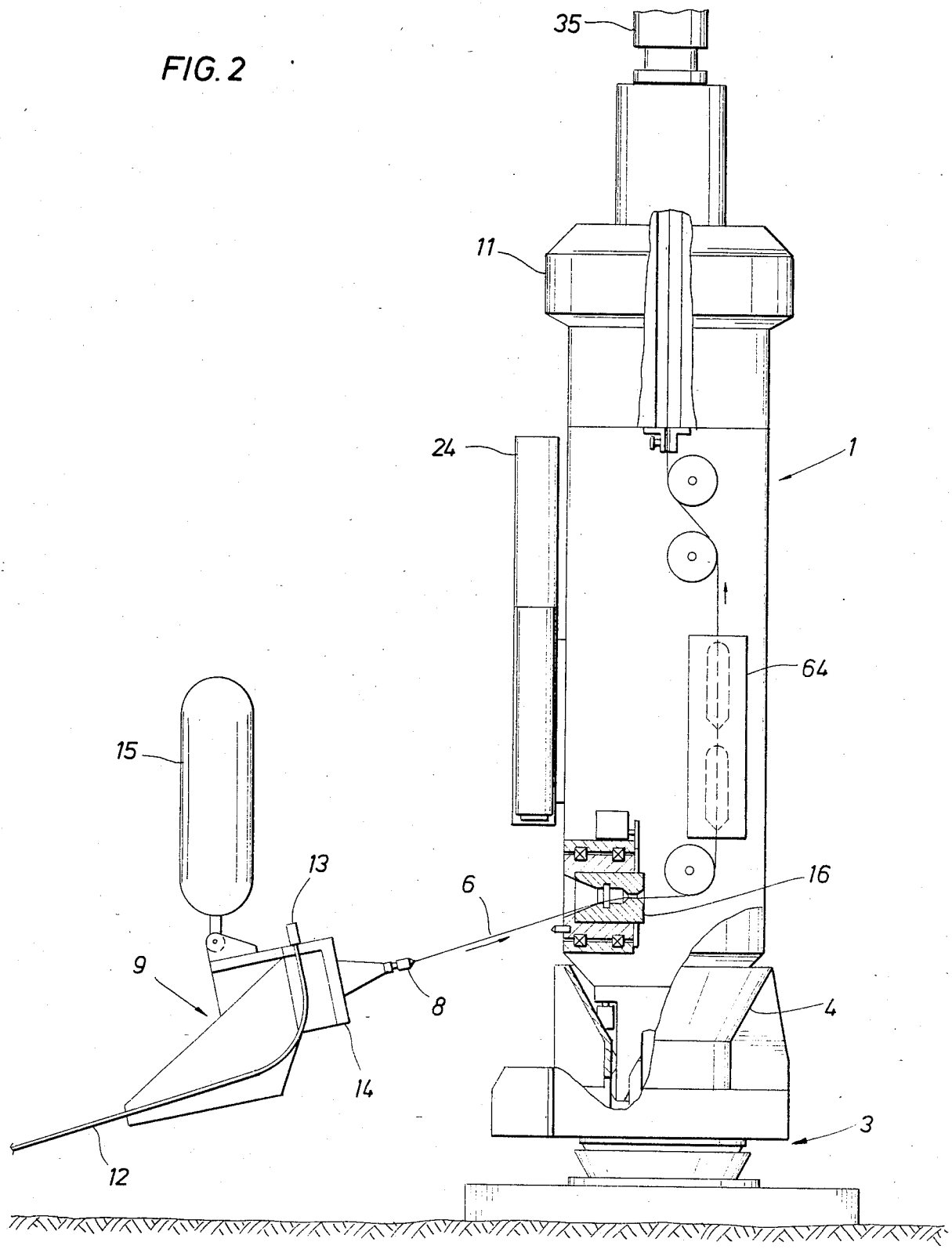
FIG. 2 discloses pulling a flowline terminal head up to the connection tool using a pullcable and a power jacking device which is built into the connection tool.

Applicant's co-pending application Ser. Nos. 499,013 filed May 27, 1983; 564,605 filed Dec. 22, 1983 and 614,425 filed May 25, 1984 are incorporated herein for more specific disclosure of the flowline connection tool and other apparatus and procedures.

As shown in FIG. 1 a flowline connection tool 1 is suspended from an offshore vessel 90 which rides in a body of water 27. The flowline connection tool 1 is connected to a riser/connection tool adapter 11 which in turn is connected through the swivel joint 35 to the riser 2. The riser 2 in effect suspends the tool 1 beneath the vessel 90. The riser 2 is supported from the offshore vessel 90 by motion compensation apparatus 62, 62A which compensates for the heave and sway of the vessel, as is well known to the art. A surface winch 63 is located on the vessel 90 which pulls in a pullcable 6 which is fed up the riser 2 after being pulled by the pullcable prime mover means 64 which is located in the flowline connection tool 1.

The flowline connection tool 1 in the preferred embodiment includes an electrical switchgear module 33 for controlling electrical devices of the flowline connection tool, a hydraulic component module 34, an underwater remotely operated vehicle 32 (shown in the stowed position) and a series of idler wheels 7 which assist the pullcable 6 in its journey through the flowline connection tool 1. At the lower end of the flowline connection tool 1 there is located guide funnel engagement means 27 which are actuated after the tool 1 is landed onto the guidefunnel 4. The guide funnel engagement means 27 are typically made by a series of interlocking latches or landing devices well known to the art which lock the flowline connection tool 1 to the guide funnel 4. The guide funnel 4 is mounted on the upper surface of a subsea structure 3 such as a wellhead or a production facility which is located in relatively deep water.

As can be seen by viewing FIG. 1 the flowline connection tool 1 has already been connected via the pullcable 6 with a bullnosed carrier 14 which will carry the flowline terminal head 9 and the flowline bundle 12 towards the flowline connection tool 1 when the tool 1 is secured to the guidefunnel 4 and the pullcable prime mover means 64, such as a power jacking device, is actuated. The flowline terminal head 9 may also include an optional buoyancy device 15 such as syntactic foam floats or an air chamber which allows the flowline terminal head 9 to supply positive buoyancy to the flowline bundle.

The retainer pin driver assembly 24 such as a hydraulic piston and cylinder mounted on the side of the flowline connection tool 1 drives a retainer pin 21 (shown in FIG. 4) during mounting of the flowline terminal head 9 to the subsea structure 3. It should be noted that the underwater remotely operated vehicle 32, though in this drawing shown in the stowed position, would most probably be in the vicinity of the subsea structure's guidefunnel 4 area during these landing operations, in order to transmit visual information to the surface vessel of the progress of the landing operations.

As shown in FIG. 2 the flowline connection tool 1 has been landed and secured to the guidefunnel 4 by actuation of the guidefunnel engagement means 27. The pullcable prime mover means 64 have been actuated by surface signals such that the pullcable 6 is moved in the direction shown by the arrow through a rotatable receptacle 16 and upwards towards the surface vessel 90. The pullcable 6 is attached to the bullnose 8 of the bullnosed carrier 14. Movement of the pullcable 6 thereby draws the flowline terminal head 9 and its associated flowline bundle 12 towards the rotatable receptacle 16 mounted within the flowline connection tool 1. The flowline connector hub 13 which forms the end elements of the flowline bundle 12 faces in a generally upward verticle direction at this point. The flowline bundle 12 is welded to the flowline connector hub 13 which adapts to a tree connector (not shown), which is placed upon the subsea structure 3 after these operations are completed.

Figure 3:
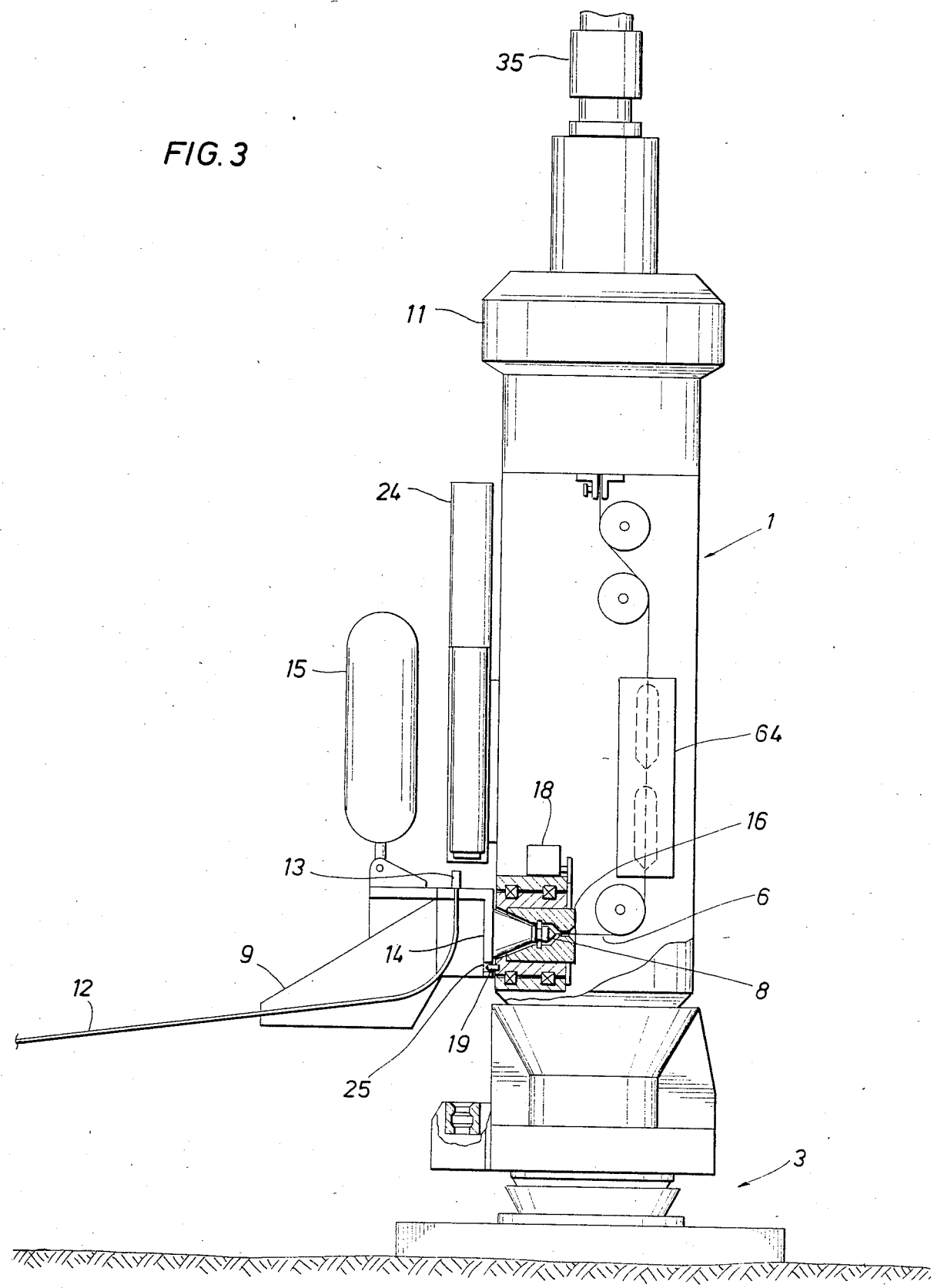
FIG. 3 shows gripping and orienting the flowline terminal head by inserting a bullnose on the bullnosed carrier into a rotatable receptacle on the connection tool.

FIG. 3 shows the flowline terminal head gripped and orientated by the rotatable receptacle 16. The pull operations of the pullcable prime mover means 64 have been secured at this time. The bullnose 8 has been drawn entirely within the rotatable receptacle 16. Since the flowline bundle 12 may have twisted slightly during its pull towards the flowline connection tool 1, the rotatable receptacle 16 driven by the receptacle driver 18 such as an electrical or hydraulic motor is rotated until the alignment pin 19 carried by the rotatable receptacle 16 aligns with and locks with an alignment pin receptacle 25 carried by the bullnosed carrier 14. Once the alignment pin 19 has been received by the alignment pin receptacle 25 then the flowline terminal head 9 carried by the bullnosed carrier 14, is rotated to its correct vertical position or any other position desired for its proper configuration. In the preferred embodiment the flowline terminal head 9 is rotated until the connector hub 13 is placed in a vertical position.

Figure 4:
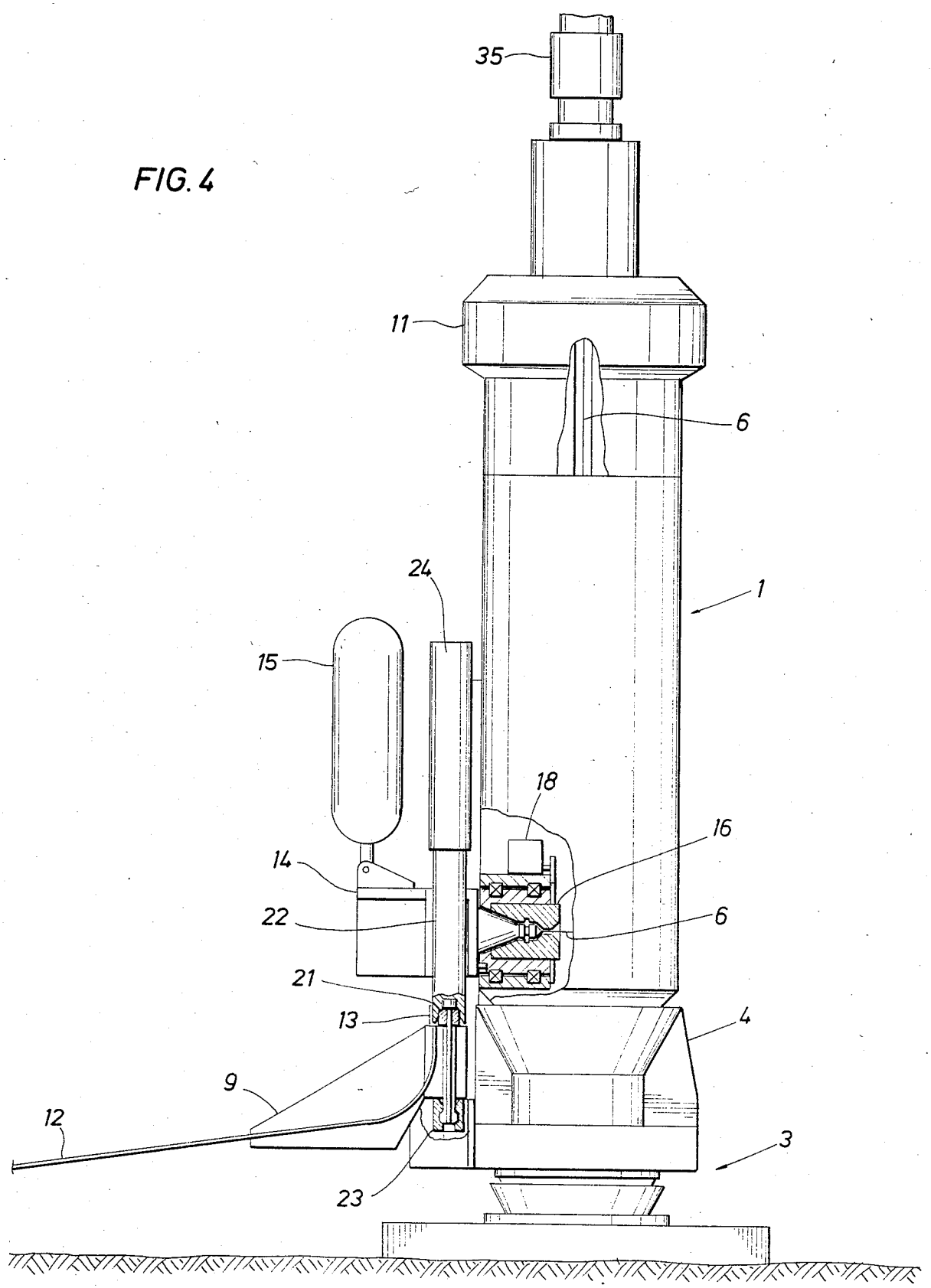
FIG. 4 depicts driving the flowline terminal head downward during insertion of a retainer pin into a retainer pin receiver.

FIG. 4 shows the flowline terminal head 9 positioned and secured to the subsea structure 3 guide funnel 4. The retainer pin driver 22 drives a retainer pin 21 down into an opening in the flowline terminal head 9 until the lower end of the retainer pin 21 is captured and secured by the retainer pin receiver 23. Various combinations of interference fits, spring devices, and latching mechanisms may be used to securely fasten the lower end of the retainer pin 21 to the retainer pin receiver 23 as are well known to the art. The upper end of the retainer pin 21 is sized with a greater outside diameter than that of the aperture formed through the flowline terminal head 9 so that the flowline terminal head 9 is prevented from upward movement away from the subsea structure 3. Once this operation is complete the flowline bundle 12 is secured to the subsea structure 3.

At this time the flowline terminal head 9 has been disconnected from the bullnosed carrier 14 since the flowline terminal head 3 has been driven downward from the bullnosed carrier 14 by the force of the retainer pin driver 22.

Correct alignment between the flowline terminal head 9 and the retainer pin driver 22 during the movement of the terminal head 9 towards its final secured location has been maintained by the use of alignment means, such as alignment rails carried on either side of the retainer pin driver 22, (not shown), as are well known to the art. The connector hub 13 has not been involved in this operation since to apply force to the face of the connector hub 13 at this time by the retainer pin driver 22 may cause seat damage to the hub 13 for future connections. The bullnosed carrier 14 remains firmly seated within the rotatable receptacle 16 by tensioning forces applied by the pullcable 6 and pullcable prime mover means 64, (not shown).

Figure 5:
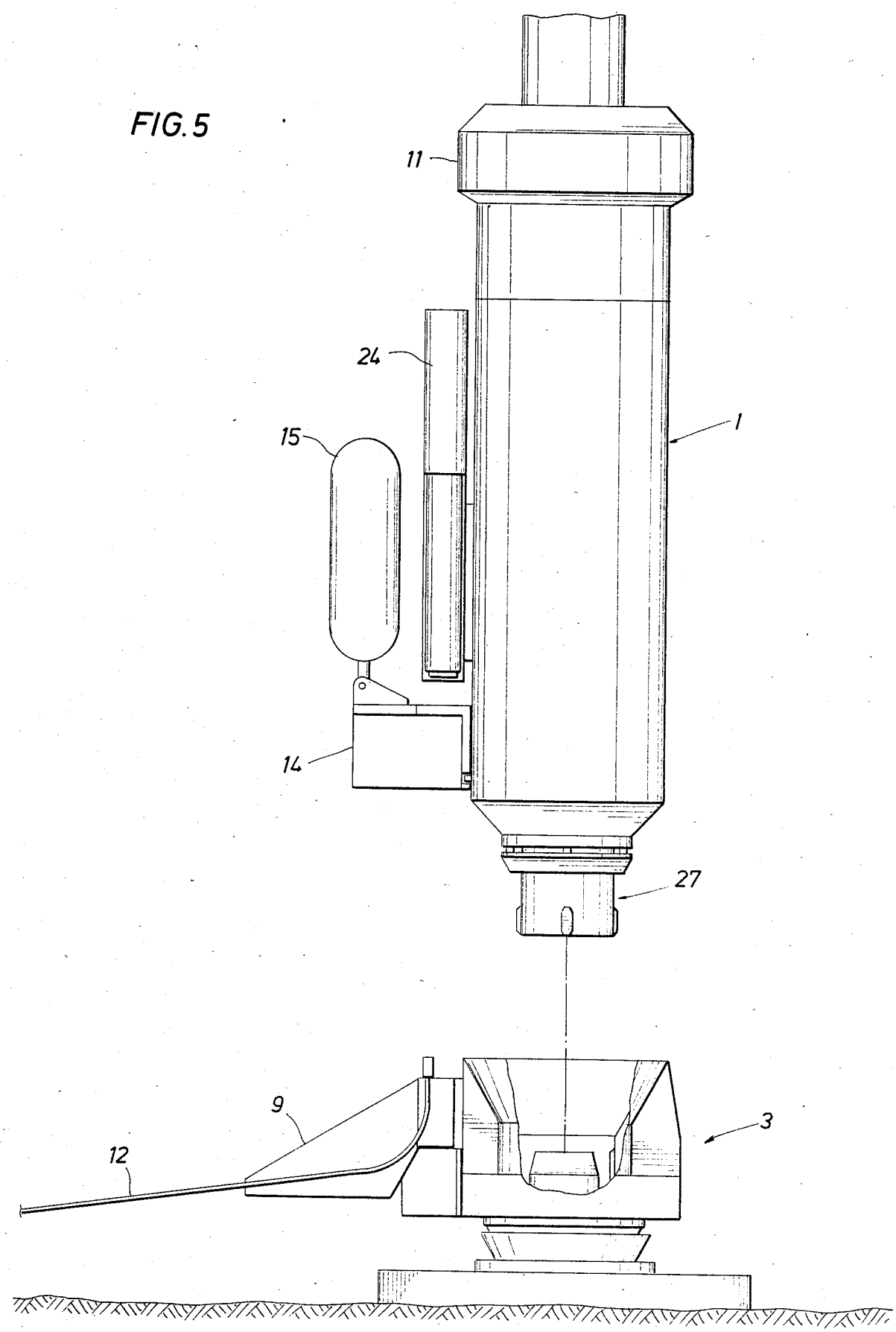
FIG. 5 shows the flowline terminal head secured to the subsea structure, and the flowline connection tool returning to the surface with the bullnose carrier attached.

As shown in FIG. 5 the flowline connection tool 1 has been disengaged from the subsea structure 3 by deactivation of the guide funnel engagement means 27. The flowline terminal head 9 remains attached to the subsea structure 3 whereas the bullnosed carrier 14 with its associated buoyancy device 15 returns to the surface vessel 90 with the flowline connection tool 1. The retainer pin driver 22, (FIG. 4) has been retracted within the retainer pin driver assembly 24. The subsea structure 3 is therefore left in a condition for placement of a wellhead manifold, or other interlocking subsea component upon its upper surface.

FIGS. 6A, 6B, 6C, and 6D show the operation cycle of a Lucker Wire Rope Jacking and Pulling System, manufactured by Lucker Manufacturing Company, King of Prussia, PA 19406, used as a prime mover means in the preferred embodiment to pull the pullcable 6. Location of the pullcable prime mover means 64 within the flowline connection tool 1 reduces the length of pullcable 6 that need be subjected to the full tension load required to pull the flowline terminal head 9 (not shown) towards the tool 1 (not shown). This reduces the possibility of pullcable 6 failure and improves system response. It is recognized that other types of prime mover means may be selected to perform the same function, such as electric or hydraulic winches or capstans well known to the art.

Figure 6A:
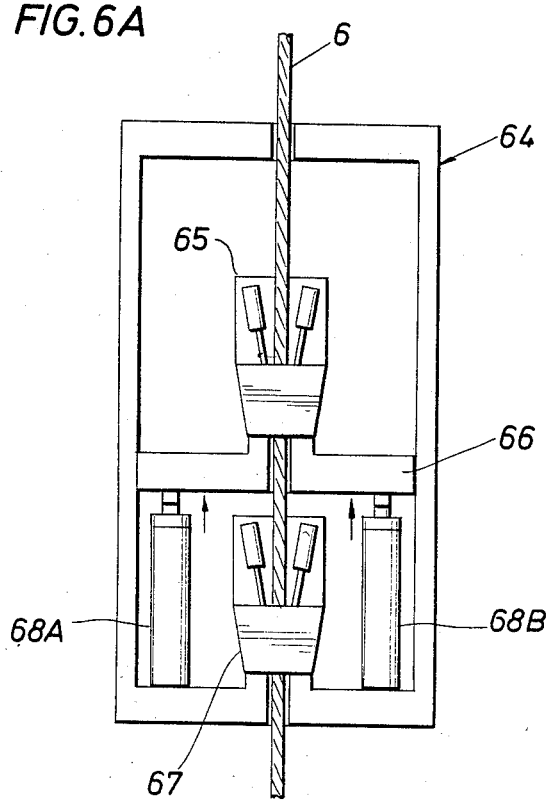
FIGS. 6A–6D show the operating sequence of a typical power jack.

As shown in FIG. 6A a pullcable 6 is positioned through an upper gripper assembly 65 and a stationary gripper assembly 67, each pullcable engagement means assembly 65, 67 capable of selectively gripping the pullcable 6.

The upper gripper assembly 65 is attached to a moving cross head 66. In this particular drawing 6A the upper gripper assembly 65 is closed firmly about the pullcable 6 thereby holding the pullcable 6 stationary. The stationary gripper assembly 67 is open at this time to allow the pullcable 6 to pass freely through it.

Figure 6B:
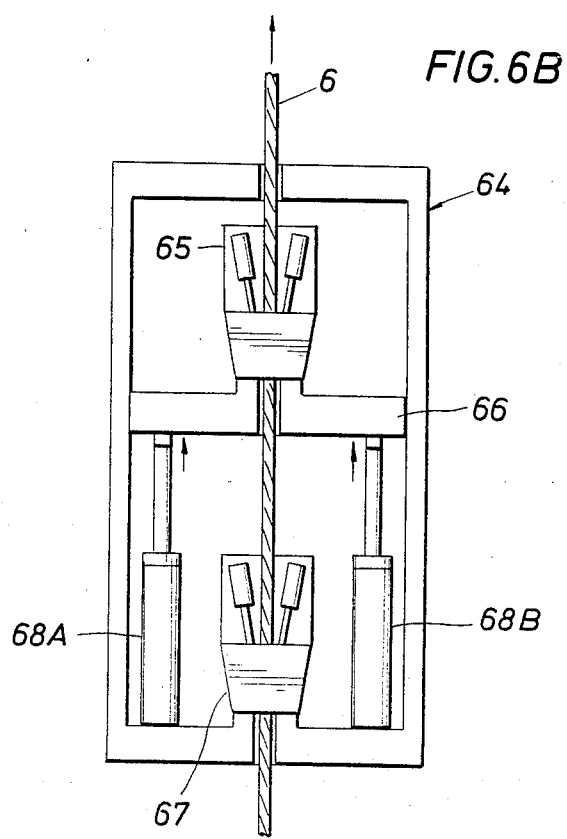

As shown in FIG. 6B a pair of hydraulic rams 68A, 68B extend the upper gripper assembly 65 forward which in turn pulls the pullcable 6 and thereby pulls the flowline terminal head (not shown) towards the connection tool 1 (not shown).

Figure 6C:
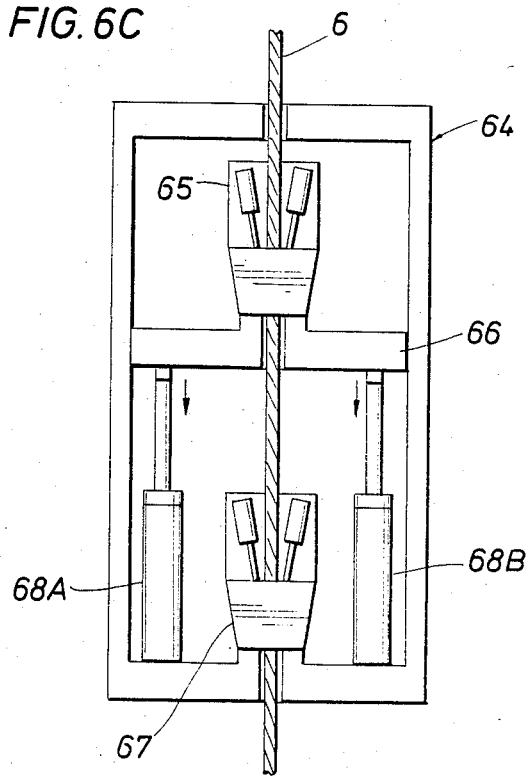

As shown in FIG. 6C at the end of the ram cycle the stationary gripper assembly 67 closes and holds pullcable 6. The upper gripper assembly 65 opens and the hydraulic rams 68A, 68B retract carrying the upper gripper assembly 65 back to its original starting position. The pullcable 6 is held by the stationary gripper assembly 67 during this sequence.

Figure 6D:
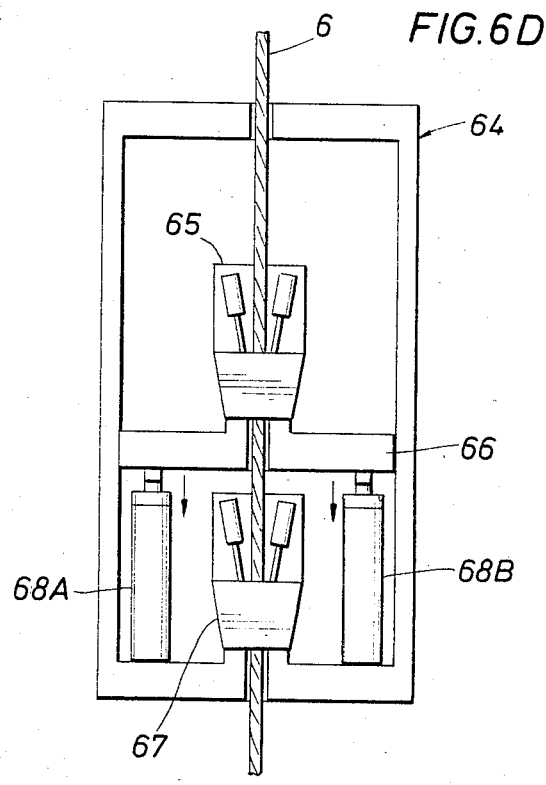

As shown in FIG. 6D when the hydraulic rams 68A, 68B are fully retracted the upper gripper assembly 65 closes on the pullcable 6 and the stationary gripper assembly 67 opens. Now the entire pull sequence can begin again.

It should be noted that the pullcable 6 may be formed by wireline or synthetic fiber rope, well known to the art.

Hydraulic power for operation of the pullcable prime mover means 64 is supplied from the offshore vessel 90 (FIG. 1) through appropriate hydraulic power lines well known to the art which are attached to the riser 2 and enter the flowline connection tool 1. Once the hydraulic power lines (not shown) reach the flowline connection tool 1, they are routed to the hydraulic components module 34 (FIG. 1) which controls the operation of the pullcable prime mover means 64, via signals from the offshore vessel 90 (FIG. 1).

As shown in 7A other alternative configurations of the flowline connection tool 1 are possible. In FIG. 7A a power winch 36 is used to pull the pullcable 6 toward the flowline connection tool 1. A storage drum 50 stores the pullcable 6 after it has been pulled by the power winch 36. Storing the pullcable 6 on the connection tool 1 eliminates the necessity of returning the entire pullcable 6 to the surface vessel 90, and allows easy pull-in and pull-out of the pullcable 6 as the flowline connection tool 1 is deployed downwards to the subsea structure 3, (FIG. 1), if required.

Power transmission lines 37 may be routed from the surface vessel 90 (FIG. 1), attached to the outside of the riser 2 by means of clamps 52, and terminate in either a power transmission module 51, mounted on the riser/connection tool adaptor 11, or be directly routed to electrical switchgear 33 and/or hydraulic components 34 carried by the flowline connection tool 1.

As shown in FIG. 7B, the vertical motion of the surface vessel 90 (FIG. 1) may be used to drive a rod 41 within the flowline connection tool 1, which has been landed and secured to the guidefunnel 4. Once the rod 41 enters the flowline connection tool 1, it becomes rotatably engaged through a pivot 43 to a ratchet tong 42. The ratchet tong 42 contacts appropriate elements of the outer wheel 44. The outer wheel 44 is connected by a hydraulic or mechanical clutch, (not shown), to the inner wheel 45. The pullcable 6 turns around the idler wheel 46 and then is wrapped around the inner wheel 45.

The rod 41 also forms a contact with a retainer pusher end cap 49 which is located above the retainer pin driver 22. Hyperextension of the rod 41 in a downward direction causes the retainer pin driver 22 to be driven downward.

In operation upward and downward movement of the surface vessel 90 (FIG. 1) causes the rod 41 to move upwards and downwards. The ratchet tong 42 translates this upward and downward movement into counterclockwise rotation of the outer wheel 44. As the vessel 90 (FIG. 1) and rod 41 heave downward the ratchet tong 42 engages the left side of the outer wheel 44 since the outer wheel 44 elements on the right side of the wheel 44 have forced the ratchet tong 42 to pivot toward the right. As the vessel heaves upward the ratchet tong 42 engages the right side of the outer wheel 44. Vertical movement of the vessel 90 (FIG. 1) causes the outer wheel 44 to continue its counterclockwise rotation. When an actuation signal is sent to the clutch (not shown) between the inner wheel 45 and outer wheel 44, the inner wheel 45 moves in a counterclockwise direction also, thereby pulling the pullcable 6 towards the flowline connection tool 1.

The latest invention has been described primarily in terms of connection of a flowline to an underwater subsea structure. The same apparatus and method may be used for connection of electrical cables and hydraulic control lines, to connect one subsea structure to another, or it may be used to connect several flowline bundles about the outer periphery of the same subsea structure, such that several flowlines to and from a single subsea structure may be connected to that structure. Such modifications as may be necessary to achieve such connection will be apparent to those skilled in the art.

Various other embodiments and modifications will also be apparent from the foregoing description. The invention is not to be construed as limited to the particular forms disclosed herein, since these are to be regarded as illustrative rather than restrictive.

I claim as my invention:
1. Method for connecting a flowline to a subsea structure, said method comprising;
   deploying a flowline connection tool to the subsea structure,
   landing and securing the flowline connection tool to the subsea structure,
   activating a pull cable prime mover means carried by the flowline connection tool, thereby
   pulling a flowline terminal head, the terminal head being connected to the flowline, to the flowline connection tool,
   securing a bullnosed carrier of the flowline terminal head to the flowline connection tool by pulling the bullnose of the bullnosed carrier into a rotatable receptacle of the flowline connection tool,
   engaging an alignment pin carried by the rotatable receptacle with a bullnosed carrier surface having an opening for said pin, by rotating the rotatable receptacle until said pin aligns with said opening which thereafter causes simultaneous movement of the bullnosed carrier and rotatable receptacle, rotating the bullnosed carrier and with it the flowline terminal head until the connector hub of the flowline terminal head is placed in a substantially vertical position, inserting the retainer pin carried by the flowline connection tool into the flowline terminal head, thereby, contacting an upper element of said pin with the flowline terminal head, thereby driving the flowline terminal head downward, thereby, engaging a lower element of said pin with a pin retainer means carried by the subsea structure, thereby, securing the flowline terminal head to the sudsea structure, and recovering the flowline connection tool to the surface.

2. Method for connecting a flowline to a subsea structure, said method comprising;

deploying a flowline connection tool to the subsea structure, landing and securing the flowline connection tool to the subsea structure, activating a pull cable prime mover means carried by the flowline connection tool, thereby pulling a flowline terminal head, the terminal head being connected to the flowline, to the flowline connection tool, securing a bullnosed carrier of the flowline terminal head to the flowline connection tool by pulling the bullnose of the bullnosed carrier into a rotatable receptacle of the flowline connection tool, engaging an alignment pin between the rotatable receptacle and a bullnosed carrier surface by rotating the rotatable receptacle, which thereafter causes simultaneous movement of the bullnosed carrier and rotatable receptacle, rotating the bullnosed carrier and with it the flowline terminal head until the connector hub of the flowline terminal head is oriented in a selected position, inserting a retainer pin carried by the flowline connection tool into the flowline terminal head, thereby, contacting an upper element of said pin with the flowline terminal head, thereby driving the flowline terminal head downward, thereby, engaging a lower element of said pin with a pin retainer means carried by the subsea structure, thereby, securing the flowline terminal head to the subsea structure, and recovering the flowline connection tool to the surface.

3. Method for connecting a flowline to a subsea structure, said method comprising;

deploying a flowline connection tool to the subsea structure, landing and securing the flowline connection tool to the subsea structure, activating a pull cable prime mover means carried by the flowline connection tool, thereby pulling a flowline terminal head, the terminal head being connected to the flowline, to the flowline connection tool, securing a bullnosed carrier of the flowline terminal head to the flowline connection tool by pulling the bullnose of the bullnosed carrier into a rotatable receptacle of the flowline connection tool, engaging an alignment pin between the rotatable receptacle and a bullnosed carrier surface by rotating the rotatable receptacle, which thereafter causes simultaneous movement of the bullnosed carrier and rotatable receptacle, rotating the bullnosed carrier and with it the flowline terminal head until the connector hub of the flowline terminal head is oriented in a selected position, securing the flowline terminal head to the subsea structure, and recovering the flowline connection tool to the surface.

4. An apparatus for pulling a flowline terminal head connected at the end of a flowline to a subsea structure, said apparatus comprising:

means for deploying a flowline connection tool to the subsea structure, means for landing and securing the flowline connection tool to the subsea structure, pullcable prime mover means carried by the flowline connection tool, means for pulling said flowline terminal head to the flowline connection tool, a bullnosed carrier operatively connected to the flowline terminal head, means for securing the bullnosed carrier to the flowline connection tool by pulling a bullnose of the bullnosed carrier into a rotatable receptacle of the flowline connection tool, an alignment pin carried by the rotatable receptacle, means for engaging said alignment pin with a bullnosed carrier surface which forms an opening for said pin, by rotating the rotatable receptacle until said pin aligns with said opening, which thereafter causes the simultaneous movement of the bullnosed carrier and rotatable receptacle, means for rotating the bullnosed carrier and the flowline terminal head carried thereby to a position such that a connector hub of the flowline terminal head is in substantially vertical position, means for inserting a retainer pin carried by the flowline connection tool until a lower element of the retainer pin is secured within a retainer pin receiver of the subsea structure and an upper element of the retainer pin contacts the flowline terminal head, to secure the flowline terminal head to the subsea structure, and means for recovering the flowline connection tool to the surface.

5. An apparatus for pulling a flowline terminal head connected at the end of a flowline to a subsea structure, said apparatus comprising:

means for deploying a flowline connection tool to the subsea structure, means for landing and securing the flowline connection tool to the subsea structure, pullcable prime mover means carried by the flowline connection tool, means for pulling said flowline terminal head to the flowline connection tool, a bullnosed carrier operatively connected to the flowline terminal head, means for securing the bullnosed carrier to the flowline connection tool by pulling a bullnose of the bullnosed carrier into a rotatable receptacle of the flowline connection tool, means for engaging an alignment pin between a bullnosed carrier surface and said rotatable receptacle by rotating said rotatable receptacle, said pin after engagement causing the simultaneous rotational movement of the bullnosed carrier with the rotatable receptacle, means for rotating the bullnosed carrier and the flowline terminal head carried thereby to a position such that connector hub of the flowline terminal head is selectively oriented, means for inserting a retainer pin carried by the flowline connection tool until a lower element of the retainer pin is secured within a retainer pin receiver defined within the subsea structure and an upper element of the retainer pin contacts the flowline terminal head, to secure the flowline terminal head to the subsea structure, and means for recovering the flowline connection tool to the surface.

6. An apparatus for pulling a flowline terminal head connected at the end of a flowline to a subsea structure, said apparatus comprising:

means for deploying a flowline connection tool to the subsea structure, means for landing and securing the flowline connection tool to the subsea structure, pullcable prime mover means carried by the flowline connection tool, means for pulling said flowline terminal head to the flowline connection tool, a bullnosed carrier operatively connected to the flowline terminal head, means for securing the bullnosed carrier to the flowline connection tool by pulling a bullnose of the bullnosed carrier into a rotatable receptacle of the flowline connection tool, means for engaging an alignment pin between a bullnosed carrier surface and said rotatable receptacle by rotating said rotatable receptacle, said pin after engagement causing the simultaneous rotational movement of the bullnosed carrier with the rotatable receptacle, means for rotating the bullnosed carrier and the flowline terminal head carried thereby to a position such that a connector hub of the flowline terminal head is selectively oriented, means for securing the flowline terminal terminal head to the subsea structure, and means for recovering the flowline connection tool to the surface.

* * * * *